Dec. 26, 1939.   W. R. HICKEY   2,184,497
SAFETY DEVICE
Filed Feb. 27, 1939
Fig. 1.
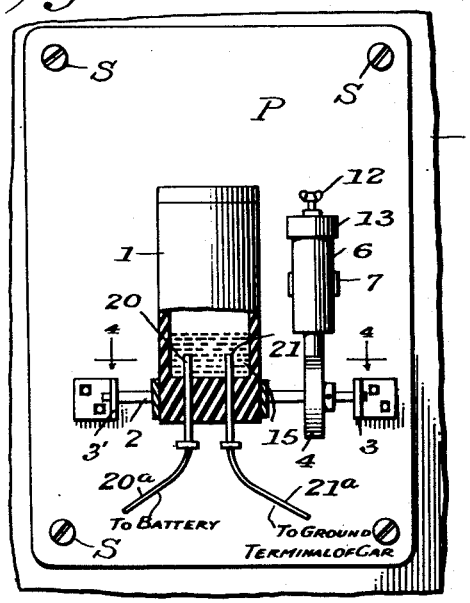
Fig. 2.
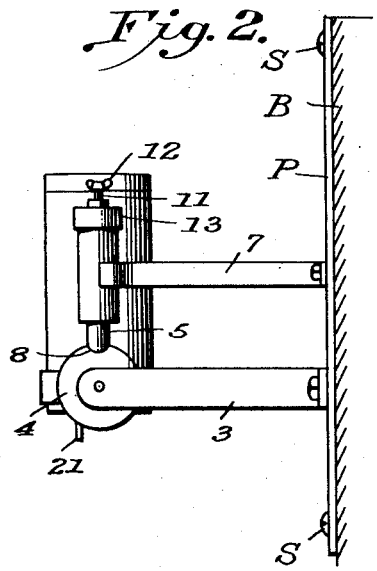
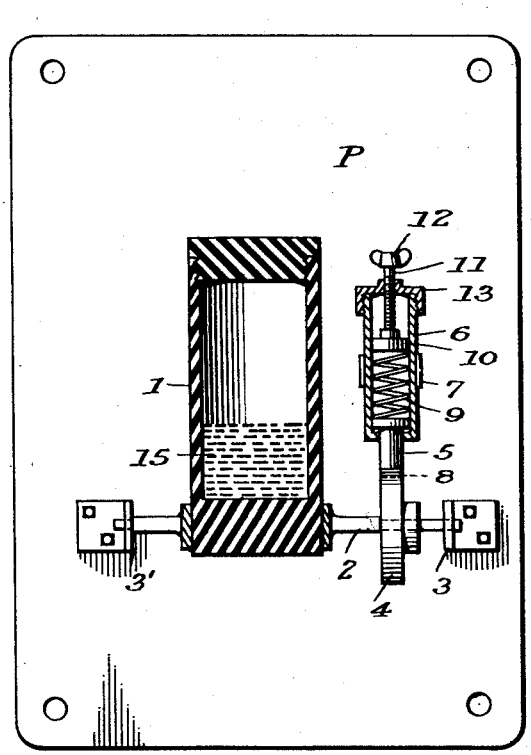
Fig. 3.
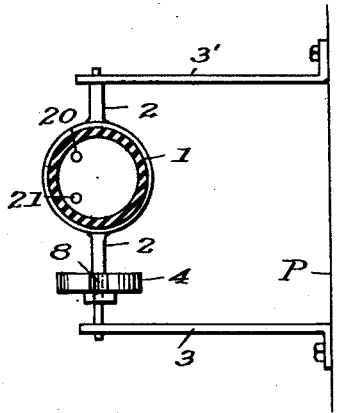
Fig. 4.
Inventor
WALTER R. HICKEY Patented Dec. 26, 1939

2,184,497

UNITED STATES PATENT OFFICE 2,184,497

SAFETY DEVICE

Walter R. Hickey, Butler, Pa.

Application February 27, 1939, Serial No. 258,798

4 Claims. (Cl. 200—52)

This invention relates to a safety device for automobiles operating as a circuit breaker for the ignition circuit under certain conditions which give rise to dangerous situations if the ignition circuit is maintained.

Upon the occurrence of accidents involving automobiles the conditions are aggravated by possibilities of fire and explosion occasioned by the ignition of the liquid fuel by the electrical circuits which are normally energized in the operation of the automobile. In order to minimize such possibilities of fire, proposals have been made to cut out or render inoperative the ignition circuit immediately upon the occurrence of a dangerous condition which might cause an explosion or conflagration. Therefore, it is the object of the present invention to provide a safety switching device which is operated automatically in response to an accident or occurrence which gives rise to a dangerous condition by the maintenance of the ignition circuit effective.

It is the object of the present invention to provide a switching device which is of low cost, simple in construction and operation, and which may be applied conveniently to any part of the car without interference with the other operative elements thereof.

It is a further object of the invention to provide a safety circuit breaker which is maintained in operative positions for all conditions normally encountered in the travel of a car, including abrupt stopping or travelling over rough roads, but which is operative to interrupt the ignition circuit upon an impact of the type experienced in the case of an accident by the collision of the front of the car or the rear thereof with another body, or by a tilting of the car beyond a critically safe angle incidental to upsetting, overturning or merely precipitous tilting.

It is a further object of the invention to provide a safety switch which is normally maintained in operative position to complete the ignition circuit of an automobile, and which moves to break the circuit upon the occurrence of an accidental condition of predetermined intensity, with a capability of a convenient adjustment of the force which is necessary to move the switch from the circuit-making position to the circuit-breaking position thereof.

Other objects and purposes will appear from the more detailed description of the invention following hereinafter, taken in conjunction with the accompanying drawing, wherein:—

Figure 1 is a front elevation with certain parts in section illustrating the switch assembly;

Figure 2 is a right end view of Figure 1, showing the safety unit attached to a vertical wall on the automobile frame;

Figure 3 is a vertical sectional view of the arrangement shown in Figure 1; and

Figure 4 is a horizontal sectional view along line 4—4 of Figure 1.

The safety switch assembly is shown mounted on a plate P which in turn is attached to a vertical wall B of the automobile body by means of screws 10 or bolts S. The wall B may be below the floor level or above it, for example the dashboard, the wall below the cowl or any other part of the automobile chassis. A switch 1, which may assume the form of a hollow cylinder of insulating material such as hard rubber or fiber, is rigidly mounted at one end thereof upon a rotary shaft 2 which is journalled in bearing brackets 3, 3' which are attached to and extend from the plate P. The shaft 2 may be connected to the opposite sides of a band encircling the lower end of the switch cylinder. The hollow switch vessel 1 is partially filled with a conducting liquid such as mercury, which normally bridges a path between electrode terminals 20 and 21 extending into the interior of the switch at the end thereof in proximity to the shaft 2. As shown in Figure 4, the terminals 20 and 21 are disposed forwardly of the axis of shaft 2 and extend into the mercury bowl for approximately half the depth thereof, which in turn fills less than half the volumetric space of the interior of the switch vessel.

Conductors 20a and 21a are connected with electrode terminals 20 and 21 respectively, with sufficient play to permit the switch to turn together with shaft 2 without hindrance. The wire 20a may be connected to the battery while the wire 21a may be connected to the ground terminal of the car. These conductors may be connected at any portion of the ignition circuit, preferably the low tension side, and the switch as shown in Figure 1 merely serves to complete the ignition circuit so that the automobile may function in the usual way. The wire 20a is connected as well to the conventional wiring system for lights, signals, etc., the circuits of which will be broken by the opening of the switch 1 to break the complete wiring system and thereby to prevent short-circuits and fires resulting therefrom.

The disposition of the vessel 1 with the mercury therein above the rotary shaft 2 gives rise to an unstable condition in view of the fact that the center of gravity of the vessel is far above the axis of shaft 2 and any tilting of switch 1 from the vertical axis would cause a rotary moment to be exerted tending to rotate the switch 180° which would bring the top of the vessel shown in Figure 1 to the bottom, whereupon the mercury would leave the electrode terminals 20 and 21 and cause a break in the ignition circuit at this point. In order to maintain the parts in the position shown in the drawing, a spring pressed holding pin 5 is provided which cooperates with a disc 4 rigidly mounted on shaft 2. The disc is fitted with a groove 8 into which presses the pin 5 by the operation of a spring 9 disposed within cylinder 6 which is attached to the plate P by means of bracket 7. A follower plate 10 operates in the cylinder 6 and is loosely mounted at the end of a screw 11 which threadedly engages the cover 13 of the cylinder 6. A thumb nut 12, fixedly attached to the upper end of screw 11, permits a convenient rotation of the screw 11 to cause the follower 10 to compress spring 9 in varying degrees in order to obtain different degrees of tightness of engagement between the pin 5 and the disc 4, requiring different degrees of force to move the switch 1 from its yieldingly retained normal position.

In the operation of the device, a predetermined adjustment of screw 11 assures a required tightness of shaft 2 which maintains the switch 1 in position to complete the ignition circuit under all conditions of travel which are normally encountered. Pin 5 engages groove 8 of the disc 4 with such force that the same is not displaced in travel. On the other hand, a sudden impact by the automobile striking a body at the front or meeting with a collision at the rear causes the shaft 2 to rock with sufficient force to displace the spring-pressed pin 5, whereupon the switch vessel completes the rocking movement by virtue of the turning moment about the axis of shaft 2 which has been initiated, and serves to interrupt the ignition circuit between the electrode terminals 20 and 21. This turning moment also arises when the car executes a precipitous tilting movement which may be incidental to an accident in which the car turns over, or which may terminate in a dangerous tilted position. This movement of the shaft is in supplement to the capability of operation of the switch by impact which usually occurs incidentally at the time that the car tilts abruptly. The breaking of the ignition circuit at this time excludes the danger of fires and explosions which occasionally occur and which the operator is unable to cope with in view of the demands for his attention in the control of the car, or because of his incapacitation by virtue of the accident.

While I have described my invention as embodied in concrete form and as operating in a specific manner for purposes of illustration, it should be understood that I do not limit my invention thereto, since various modifications will suggest themselves to those skilled in the art without departing from the spirit of my invention, the scope of which is set forth in the annexed claims.

I claim:

1. A safety switch comprising a hollow vessel of insulating material, electrode terminals extending into said vessel, a conducting liquid within said vessel normally bridging said electrode terminals, means for mounting said vessel comprising a rotary supporting shaft therefor below the center of gravity of said vessel and the contents thereof, a disc rigidly mounted on said shaft provided with a recess on the periphery thereof, a pin resiliently engaging said recess to yieldingly restrain said shaft from rotation and adapted to be displaced by impact or steep tilting to permit said shaft to rock said vessel from its normal upright position to a position which conveys the conductive liquid into a portion of the vessel remote from the electrode terminals.

2. A safety switch comprising a vessel of insulating material, electrode terminals extending into said vessel, mercury in said vessel normally bridging said electrode terminals, means for mounting said vessel comprising a rotary supporting shaft therefor below the center of gravity of said vessel and the contents thereof, a disc rigidly mounted on said shaft provided with a recess on the periphery thereof, a pin engaging said recess, a spring for pressing said pin into engagement with said recess, means for adjusting the compression of said spring and the consequent tightness of said engagement, said pin adapted to be displaced from said recess by impact or steep tilting to permit said shaft to rock said vessel from its normal upright position to a position which conveys the mercury into a portion of the vessel remote from the electrode terminals.

3. A safety switch unit comprising a plate, a vessel of insulating material, electrode terminals extending into said vessel, a conducting liquid within said vessel normally bridging said electrode terminals, means for mounting said vessel comprising a rotary supporting shaft therefor rigidly connected with one end of said vessel below the center of gravity of said vessel and the contents thereof, bearing brackets attached to said plate for supporting the opposite ends of said shaft, a disc on said shaft and resilient holding means cooperating therewith for yieldingly retaining said shaft in normal position, said holding means adapted to be displaced in response to an impact or steep inclination to permit said rotary shaft to carry said vessel into a position which interrupts the conductive path of said liquid extending between said electrode terminals to break the ignition circuit.

4. A safety switch comprising a plate, a vessel of insulating material, electrode terminals extending into said vessel, a conducting liquid within said vessel normally bridging said electrode terminals, means for mounting said vessel comprising a rotary supporting shaft therefor rigidly connected with one end of said vessel below the center of gravity of said vessel and the contents thereof, bearing brackets attached to said plate for supporting the opposite ends of said shaft, a disc rigidly mounted on said shaft provided with a recess on the periphery thereof, a holding cylinder attached to said plate and containing a pin for engaging said recess, a spring in said cylinder adjacent said pin for pressing said pin into engagement with said recess, means associated with said cylinder for adjusting the compression of said spring and the consequent tightness of said engagement, said pin adapted to be displaced from said recess by impact or steep tilting to permit said shaft to rock said vessel from its normal upright position to a position which conveys the conductive liquid into a portion of the vessel remote from the electrode terminals.

WALTER R. HICKEY.